United States Patent

[11] 3,630,391

| [72] | Inventor | Walter W. Wilson<br>Levittown, Pa. |
|---|---|---|
| [21] | Appl. No. | 794,523 |
| [22] | Filed | Jan. 28, 1969 |
| [45] | Patented | Dec. 28, 1971 |
| [73] | Assignee | Gulf & Western Industrial Products Company<br>Grand Rapids, Mich. |

[54] WORK GRIPPER
13 Claims, 8 Drawing Figs.

[52] U.S. Cl. .................................................. 214/1 BB,
214/1 BC, 269/32, 269/58, 269/232, 294/116
[51] Int. Cl. ........................................................ B66c 1/42,
B55j 9/00
[50] Field of Search ............................................ 269/32, 58,
200, 232, 233, 234; 214/1 BB; 10/12 T; 294/116

[56] References Cited
UNITED STATES PATENTS

| 2,272,592 | 2/1942 | Wilcox | 10/12 T |
| 492,931 | 3/1893 | Baird | 269/234 X |
| 2,335,743 | 11/1943 | Cross | 269/234 X |
| 2,850,926 | 9/1958 | Jobe | 269/234 X |
| 3,279,624 | 10/1966 | Devol | 214/1 BB X |

FOREIGN PATENTS

| 418,503 | 1934 | England | 269/233 |

Primary Examiner—Francis S. Husar
Attorney—Meyer, Tilberry and Body

ABSTRACT: A work handling assembly especially adapted for automated equipment comprising a movable arm, piston means supported on said arm, and removable cam means supported on the piston means, the arm including guide means for controlling the line of movement of said cam means. Also supported on the arm is a work engaging means including an actuating end and an opposed actuated end adapted to engage a workpiece; the actuating end being in line with the line of movement of said cam means and engaged thereby for controlled movement of the work engaging means actuated end.

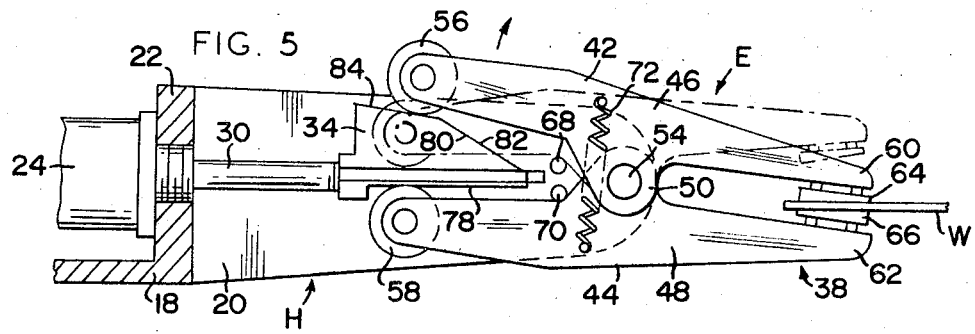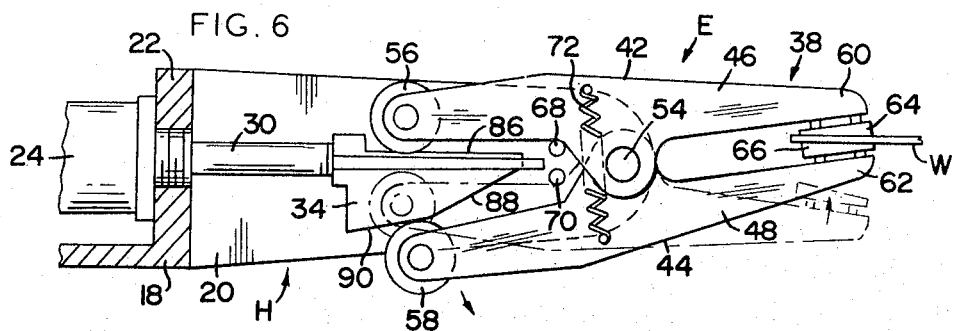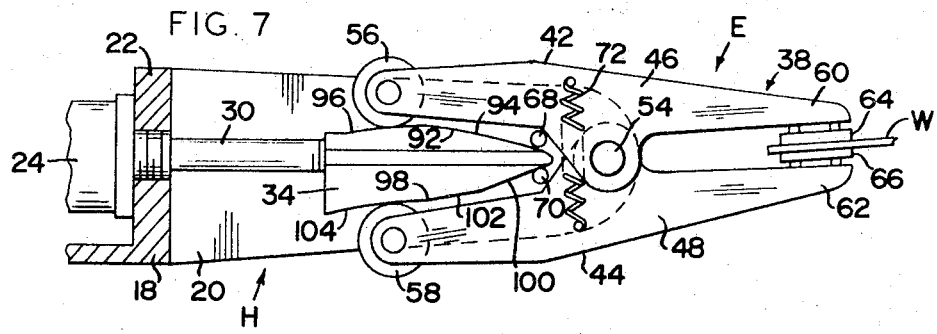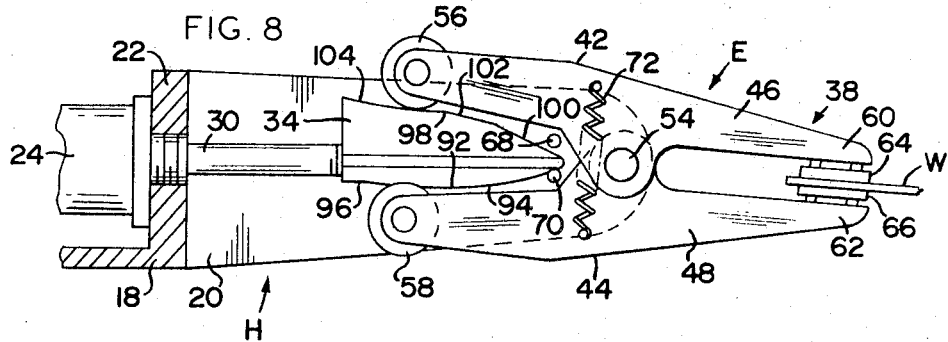

WORK GRIPPER

The present invention relates to a novel work handling assembly and particularly to work handling assemblies which include work engaging means thereon, or mechanisms for engaging a workpiece.

The invention is particularly applicable to high production rate automated equipment, which has a plurality of work stations, for instance that used in the manufacture of high production consumer items, and to work transfer assembly for transfer of workpieces between the work stations; and will be described with particular reference thereto, although it will be appreciated that the invention has broader applications, for instance in the engaging and handling of workpieces at a single work station.

One type of apparatus to which the invention is particularly applicable, is a high production rate automated press line, wherein a number of presses are generally in a tandem relationship and driven in unison to perform a series of operations on a workpiece. A plurality of work transfer mechanisms or assemblies are provided to introduce and remove the workpieces from the presses, and to transfer the workpieces from one press to the next.

It is extremely important in such lines to obtain a high production output, requiring a high production rate or maximum number of parts per hour from the line; in the case of a press, rapid reciprocation of the press dies; and in addition, to obtain an optimum degree of machine versatility or utilization. In this latter respect, each component of the line must be capable of performing a plurality of operations with minimum changeover time from one operation to a different operation. For instance, in a press line, it is necessary that the line be capable of rapid changeover from one size die to another, as well as changeover from a forming die to a blanking or other die, and vice versa. Such versatility, or utilization, in addition to increasing production output, has the advantage of reducing the number of presses required by a manufacturer, making available valuable floor space for other equipment or functions.

Simplicity and extreme accuracy are also requirements of components of a high production rate automated machine line.

Work handling assemblies, as well as transfer assemblies, are well known, particularly for flat workpieces. A conventional work handling assembly comprises pairs of jaws or other work engaging means or mechanisms, mounted on an arm or other extension actuated to embrace and then clamp on the edge of a workpiece. Particularly where clamping is desired, and if the workpieces are of substantial size, considerable pressure must be exerted against opposite surfaces of the workpiece by the clamping jaws to handle the workpiece.

In the place of jaws, the work engaging portion or means of the work handling assembly may comprise a vacuum cup or magnet adapted to engage and pick up a workpiece.

In the case of jaws, to obtain this gripping pressure, it is conventional practice to actuate the jaws by means of a toggle mechanism including pairs of toggle links in turn actuated by a suitable piston member to open and close the gripping jaws. Although one advantage of the toggle mechanism is the pressure which can be obtained, the toggle mechanism also is used conventionally even if the work engaging portion or means is in the form of a magnet or vacuum cup, both of which engage only one surface of a workpiece.

A number of difficulties are experienced with the toggle actuating mechanism. For one, because of the toggle linkage, the mechanism is fairly bulky, and in the case of rapidly cycled production machinery, for instance a rapidly reciprocated press, there is the difficulty of obtaining clearance between the machine movable components, such as the press dies, and the work handling assembly; to the extent that the components or dies may require notching to avoid interference. In other words, in the case of press dies, the work handling assembly including the work engaging portion thereof moves in and out of the space between the dies to insert and remove a workpiece; and to obtain rapid reciprocation of the press, it is necessary to have the assembly, at least in part, between the dies during the time when the dies are less than maximum distance apart. The resulting speed of the press becomes limited by the degree to which interference between the work handling assembly and the press dies can be eliminated through notching the dies.

As a further difficulty, because the toggle actuated work engaging mechanism is bulky, there is excessive inertia in the mechanism, particularly for a rapidly reciprocated press, limiting the speed with which the press can be driven without creating excessive vibrations in the work handling or transfer equipment.

Further, the versatility of the toggle actuated work engaging mechanism is limited. For instance, it may be desirable, not only to reach into the space between a pair of dies to remove a workpiece, but also to lift a workpiece away from a die surface and then out of the space between the dies. This pronation or rotation horizontally and up or down of the work engaging portion of the work handling assembly is almost impossible to obtain if the portion or mechanism is toggle actuated. Particularly difficult to obtain are different pronations or movements of the work engaging mechanism for different operations.

Accordingly, it is an object of the present invention to overcome the above disadvantages, and in particular to provide a work handling assembly which is of optimum versatility, and capable of rapid changeover from one operation to the next.

It is also an object of the present invention to provide a work handling assembly which is less bulky than prior such assemblies, particularly having a slimmer, elevation view, profile, and less inertia for rapid stroking or cycling of the machine with which it is associated.

In accordance with the above objects, the present invention comprises a work handling assembly especially adapted for high production rate automated equipment including a movable arm; piston means supported on said arm; removable cam means on said piston means; the arm including guide means controlling the line of movement of said cam means, and a work engaging means comprising an actuating end and an opposed actuated end the latter of which engages a workpiece; the actuating end being in line with the line of movement of said cam means and engaged thereby for controlled movement of the work engaging means actuated end.

Preferably, the work engaging means includes pairs of opposed jaws defining the actuated end of said means, the jaws being pivotally connected together about a pivot center and including extensions or actuating arms which are disposed on the side of the pivot center opposite the jaws and which define the work engaging means actuating end, the cam means including opposed cam surfaces which engage said extensions or actuating arms.

By suitably programming the cam surfaces, both jaws in the closed position can be rotated upwardly or downwardly from their normal plane, and then opened to release the workpiece; or vice versa.

Since the clamping pressure and weight of the workpiece may be considerable, the guide means preferably is a guideway on the assembly arm engaging opposed sides of the cam means remote from said opposed can surfaces, constraining the movement of the cam means exactly to a desired line of movement.

It will be apparent that in addition to other advantages, the present invention provides a work handling assembly which has a slim profile and is of minimum weight particularly adapted for use as a transfer mechanism in a rapidly cycled automated press line.

The invention and advantages thereof will become apparent upon further consideration of the specification, with reference to the accompanying drawings, in which FIG. 1 is an elevation view showing an automated press line including a plurality of work transfer mechanisms in accordance with the presence invention;

FIGS. 5, 6, 7 and 8 illustrate operation of the work handling assembly in accordance with the invention.

Figure 1:
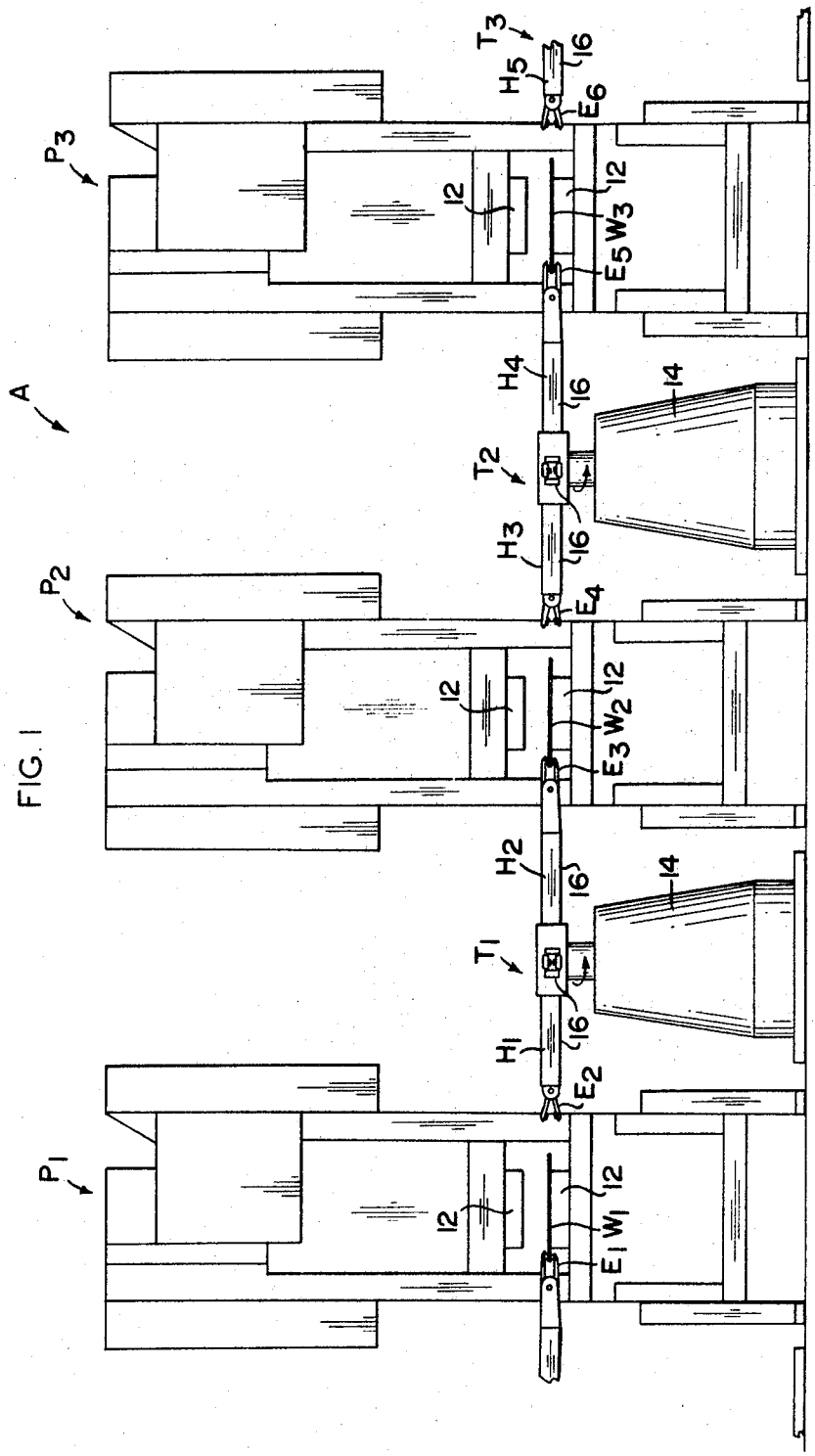

Referring now to the drawings, where the showings are for the purpose of illustrating the preferred embodiments of the invention only and not for the purpose of limiting the same, the FIGURES show an automated high production rate press line A including a plurality of spaced work stations or presses $P_1$, $P_2$, $P_3$..., and a plurality of work transfer mechanisms $T_1$, $T_2$, $T_3$...between the presses or work stations, adapted for automated and synchronized press operation, the work transfer mechanisms each including a plurality of work handling assemblies $H_1$, $H_2$, $H_3$...indexed to transfer a workpiece $W_1$, $W_2$, $W_3$...from one work station or press to the next. Part of each assembly H is a work engaging means or mechanism $E_1$, $E_2$, $E_3$....

Referring in particular to FIG. 1, a typical automated and synchronized high production rate press line will include a plurality of presses $P_1$, $P_2$, $P_3$..., each press in the line comprising a pair of dies 12, one being supported on a reciprocable platen to perform a work operation on a workpiece disposed in the press between the dies. The work operation may be blanking, forming, drawing, coining, or any of the operations performable on a press, and the concepts of the present invention are equally applicable to the various operations.

Between each press, as well as on the leading side of the first press, and the trailing side of the last press, the transfer mechanisms $T_1$, $T_2$, $T_3$...each comprises an upright rotary housing 14, which is rotated in 90° increments, about a vertical axis, and which supports at intervals 90° apart, or at right angles to each other, a plurality of transfer mechanism arms 16 which extend radially from the housing with respect to the axis of rotation of the housing. Each of the arms is part of a work handling assembly $H_1$, $H_2$, $H_3$..., the arms being extendable and retractable to permit the work engaging means $E_1$, $E_2$, $E_3$,...of each assembly positioned at ends of the assembly arms to engage a workpiece W between the press dies; remove it from the dies; transfer it by rotation of the transfer mechanism from one press to the next, and insert or position it between the dies of the next press. Once gripped or engaged, the workpiece is not released until placed between the succeeding downstream die. In a manner which is not part of this invention, the work handling assembly arms 16 are not only extendable and retractable but can be raised or lowered, and introduced into a press at different angles depending upon operation requirements. Any one motion or combination thereof is accomplished by a plurality of pneumatic cylinders, linkages, programmed circuits and like devices.

Although the transfer mechanism arms are shown as part of a transfer mechanism separate from the presses or work stations, it is obvious that they can equally well be supported on the press housings at the inlet and outlet sides thereof, and associated with continuous conveyors or other devices for transfer of workpieces from one station to the next.

Figure 2:
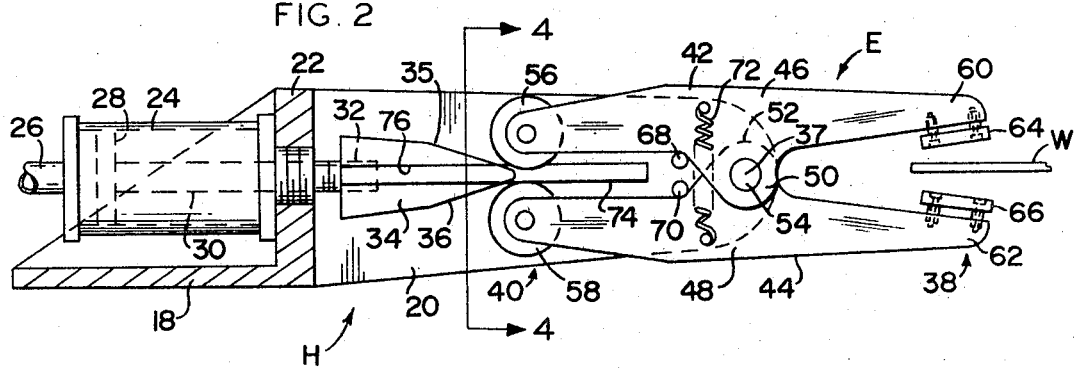
FIG. 2 is a section view of a work handling assembly in accordance with the invention.

FIG. 2 illustrates in detail that portion of a work handling assembly H supported on the end of each assembly arm 16, including the work engaging mechanism E. Essentially, each handling assembly H comprises a housing 18 including sidewalls 20 and an end wall 22, the housing being suitably supported on or connected to the arm 16. The end wall of the housing supports an air cylinder 24, which is connected with a pneumatic line 26, and inside the cylinder, a piston 28 is actuated for reciprocable movement within the cylinder. The piston rod 30 connected to the piston 28 penetrates the end wall 22 of the housing 18, and supports on its terminal end 32 a suitable cam means 34, including upper and lower cam surfaces 35 and 36, to be described in more detail. Actuation of the piston 28 in the cylinder 24 advances the cam means 34 from a rearward position when the piston assembly is contracted, to a forward or advanced position when the piston assembly is extended.

Also supported between the opposing sidewalls 20 of the housing 18, forward of the end wall 22 and spaced therefrom, is the assembly work engaging means E including a pivot center 37, an actuated end 38 on the side of the pivot center remote from the cam means 34, and an actuating end 40 on the same side of the pivot center as the cam means, the actuated and actuating ends 38 and 40 thereby extending forwardly and rearwardly of the pivot center 37, respectively.

The work engaging means or mechanism comprises upper and lower arms 42 and 44 both of which have longitudinally extending axes between the opposite actuated and actuating ends, and body portions 46 and 48 generally disposed along these axes in a spaced-apart relationship. Intermediate or between the opposite actuated and actuating ends, however, the arms are provided with inward extensions 50 and 52, directed towards each other and in overlapping relationship to engage a common pivot pin 54 positioned between the housing sidewalls 20 at the pivot center 37, and generally in the line of motion of the cam means 34.

At the actuating end 40 of the work engaging means, upper and lower rollers 56 and 58 are mounted on the arms 42 and 44, approximately along the axes thereof, the rollers being dimensioned to provide cam follower or engagement surfaces which are in spaced-apart relationship, but engage the cam means upper and lower surfaces 35 and 36 when the latter is moved from its rearward position to its advanced position with extension of the piston assembly. At the opposite actuated end 38 of the work engaging means, the upper and lower arms 42 and 44 support inwardly facing spaced-apart jaws 60 and 62, respectively, the jaws including spring loaded pads 64 and 66 located on the arms to contact a workpiece W being gripped.

Instead of upper and lower rollers, 56 and 58, other types of cam follower surfaces can be used. In addition, in place of the jaws 60 and 62, and pads 64 and 66, it is obvious that other types of work engaging means can be used.

Also shown in FIG. 2 are jaw stops 68 and 70, which position the upper and lower arms 42 and 44 when the jaws 60 and 62 are in an open position, and tension spring means 72 between the arms rearward of the pivot pin 54 holding the jaws against the stops. Location of the spring means is not critical as long as its position avoids interference with movement of the cam means 34.

Figure 4:
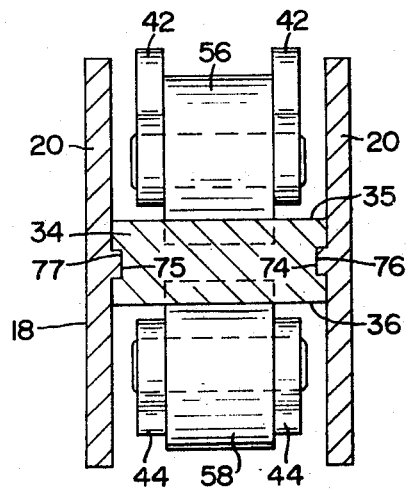
FIG. 4 is an enlarged section view taken along line 4—4 of FIG. 2.

Extending longitudinally in the housing, on the opposed sidewalls 20, forward of the housing end wall 22 and between the end wall and pivot center 37, there is provided opposed and facing guideways 74 and 75 which are in the form of longitudinally extending ribs (Notice FIG. 4). The cam means 34 is provided with opposed slots 76 and 77 on opposite sides which engage and slide along the guideways 74 and 75 constraining the movement of the cam means to a predetermined desired line of motion.

Although the guideways and cam slots are shown as being a track and slide combination, the movement of the cam means obviously can be controlled in other ways.

Preferably, the cam means 34 is threaded onto the piston rod 30, utilizing threads 32, or is otherwise removable, for replacement with differently shaped cam means for reasons to be described.

Figure 3:
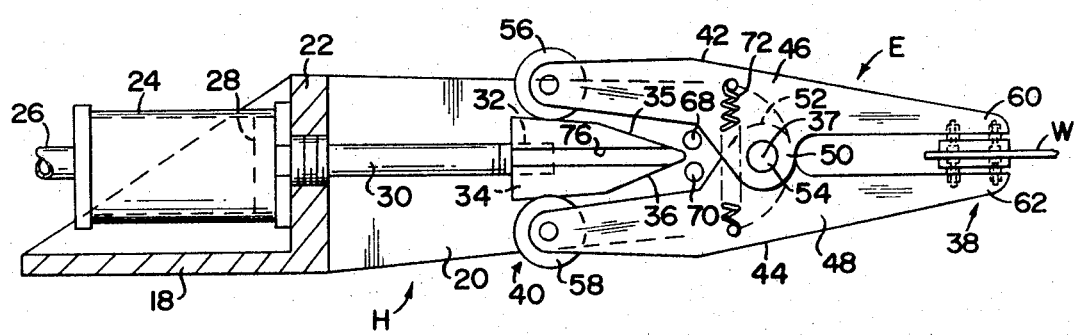
FIG. 3 is a section elevation view of the assembly of FIG. 2 engaging a workpiece in accordance with the invention.

Referring to FIG. 3, the work engaging mechanism E is actuated by extending the piston assembly advancing the cam means from its rearward position to its advanced position so that the cam surfaces 35 and 36 engage the rollers 56 and 58 of the mechanism. This spreads the upper and lower arms apart, at the actuating ends thereof, forcing the jaws 60 and 62 together and into clamping relationship with the workpiece W. On retraction or withdrawal of the cam means to its rearward position, the jaws are opened by the spring means 72, bringing the upper and lower arms together against the stops 68 and 70. By differently programming the cam surfaces 35 and 36, different movements of the jaws 60 and 62 can be obtained.

The workpiece may be very heavy, and it is a feature of the invention that the cam means causes the work engaging jaws to position the workpiece accurately. This requires minimum deflection of the cam means. For this purpose, the guideway engaging surfaces 76 and 77 of the cam means on opposite sides of the cam programmed upper and lower surfaces 35,36 are coextensive with the programmed surfaces. In addition, the guideways 74 and 75 are extended so that the side surfaces 76 and 77 are completely supported when the cam is in engagement with the rollers 56 and 58 of the work engaging jaws. By fully supporting the cam means along the sides thereof, the cam surfaces 35 and 36 can be programmed freely without limitation.

It was described that the cam means 34 essentially is four sided, including opposite sides which engage the cam guideways and upper and lower cam surfaces which engage the cam followers. This cam design provides a degree of versatility which is unavailable in the conventional toggle actuated work handling and transfer mechanisms of the prior art.

FIGS. 5–8 illustrate this versatility, FIGS. 5 and 6 showing the manner in which a workpiece W, positioned on a plane or at an elevation different from the plane of movement of the work handling assembly H, is gripped. In FIG. 5, the workpiece is on a lower plane, and the work handling assembly is advanced until the opposing jaws embrace an edge of the workpiece at which time the upper jaw 42 only is actuated to close downwardly on the workpiece. To accomplish this, the lower surface 78 of the cam means 34 is essentially flat, the upper surface 80 having an immediate steep slope 82, followed by a more horizontal slope 84, the two slopes 82 and 84 together being substantially coextensive in a horizontal direction with the lower surface 78. Also, as shown, the lower surface 78 of the cam means is at the same elevation as the lower cam follower surface (when the lower arm 44 of the work engaging mechanism is in the at rest position against lower stop 70), so that on advancement of the cam means between the cam follower surfaces, the lower arm does not move or pivot at all. Only the upper arm is pivoted, at first rapidly by the relatively steep slope 82 of the cam upper surface, and subsequently at a lesser rate by the more horizontal slope 84 of the cam upper surface. In this way the workpiece W is first rapidly gripped, and then the gripping pressure is more slowly increased to the desired amount.

FIG. 6 illustrates articulation only of the lower jaw, to grip a workpiece at a higher elevation, the cam surface defining a relatively flat upper surface 86 and first and second lower surfaces 88 and 90 having different slopes.

One instance where the arrangements of FIGS. 5 and 6 is useful is where the configuration of an upper or lower die interferes with insertion of the work handling assembly between the dies. The low profile of the assembly in accordance with the invention overcomes the problem to a substantial extent, but in addition, by being able to advance the assembly along a centerline above or below the workpiece, notching of the dies can usually be avoided.

FIGS. 7 and 8 illustrate pronation of the work gripper in accordance with the invention. If the press is performing a drawing operation, a workpiece, following the drawing step may remain with the upper or lower die. Although some presses are provided with lifters which will knock out a workpiece from the die with which it is engaged, it may be desirable or necessary to perform this knockout function or removal with the work transfer mechanism. To do this, in accordance with the present invention, following clamping, the jaws are programmed to take an upward or downward rotational or pivot movement raising or lowering the workpiece from the die surface, after which the work handling assembly and workpiece are removed from between the dies.

As shown in FIG. 7, the upper surface 92 of the cam 34 is first sloped upwardly (slope 94), and then is actually provided with a downward slope 96. The lower surface 98 has an initial slope 100 which is relatively steep, tapering off to a lesser slope 102, and then to a curved downwardly extending surface 104 parallel to the upper rearmost slope 96 of the cam upper surface. By means of the two cam surfaces, the jaws initially clamp rapidly on the workpiece W, the latter being on the plane of the jaw pivot center, the pressure being gradually increased after the initial clamping; and then by means of the rearmost upper and lower surfaces the jaws and clamped workpiece are raised as shown to an elevation above the plane of the jaw pivot center. This design cam would be used where the workpiece remains with the lower die.

In the arrangement of FIG. 8, the cam surfaces are reversed, the pronation being reversed and in a downward direction, following clamping.

The advantages of the invention should be apparent. For one, the clamping mechanism offers a substantially slimmer vertical or elevation view profile than the toggle jaws of the prior art, with the result that the mechanism can advantageously be used between rapidly closing dies of a press, without the necessity of die notching. In addition, since the mechanism is simpler and less bulky, there is less inertia in it, permitting faster cycling, a requirement of modern high production rate automated press lines.

In addition, the present invention provides a degree of versatility which is difficult to match with the conventional toggle mechanism. By means of the use of replaceable cams, virtually any gripping and pronating action can be obtained. The jaws can be adjusted to grip rapidly or slowly, to apply variable pressures, and raise or lower the workpiece, as desired.

In this latter respect, the gripping mechanism is of particular value in the use of synchronized press lines where the presses are not provided with lifters, or where it is desirable not to use lifters.

The invention also provides a means for accurately locating or gripping the workpiece. For instance, in the example of FIGS. 5 and 6, the workpiece may be very heavy, and if component parts of the work handling assembly were to deflect, the movement of the workpiece would be at a lower elevation than desired; perhaps resulting in interference to the extent requiring die notching to accommodate the work handling assembly (raised to compensate for the deflection). By means of the guideways in the assembly housing and cam slots on the sides of the cam means, this deflection is minimized.

Variations will be apparent to those skilled in the art. For instance, instead of gripping jaws, the work handling assembly can be adapted for use with vacuum or magnetic pickup or gripping means. In addition to pneumatically actuating cam means, cam means may be mechanically, or electrically actuated by the use of solenoids or other devices. Also, with reference to FIG. 1, each mechanism arm 16 can support one or a plurality of the work handling assemblies, the latter being for very heavy or very flexible workpieces.

Although the invention has been described with reference to specific embodiments, other variations within the scope of the following claims will be apparent to those skilled in the art.

What is claimed is:

1. A workpiece gripping apparatus for use with a workpiece removal apparatus, said gripping apparatus comprising:
    first and second workpiece gripping arms pivotally mounted relative to a common pivot mounting for movement between a first spaced-apart position and a second workpiece gripping position, said first and second arms each including a bearing area;
    interchangeable means for closing said arms movable between a first noncontacting position and a second contacting position in bearing contact with said bearing areas to effect movement of said arms between said first and second positions, said interchangeable means permitting varied movement of said second position relative to said apparatus;
    means for forcing said closing means between said noncontacting and said contacting positions; and,
    means for retaining said members in said first position when said closing means is in said noncontacting position.

2. The apparatus as defined in claim 1 wherein said apparatus includes a frame for supporting the components of said apparatus and for mounting said apparatus to said removal apparatus.

3. The apparatus as defined in claim 2 wherein said frame and said closing means include guide means for guiding said closing means during travel between said noncontacting and said contacting positions.

4. The apparatus as defined in claim 2 wherein said retaining means comprises a spring and said frame includes workpiece gripping arm stops for determining said first spaced-apart position.

5. The apparatus as defined in claim 3 wherein said closing means comprises an interchangeable cam having at least one cam surface for selective engagement with each said bearing area.

6. The apparatus as defined in claim 1 wherein said gripping arms each include a forwardly extending jaw portion and a rearwardly extending bearing area portion, said forwardly and rearwardly extending portions being disposed on the opposite sides of said pivot mounting.

7. The apparatus as defined in claim 6 wherein said closing means comprises a cam having at least one cam surface for selective engagement with each said bearing area portion, whereby when said cam surfaces are in engagement with said bearing area portions said jaw portions are directed between said first and second positions.

8. The apparatus as defined in claim 7 wherein said cam is interchangeable with a plurality of other cams each having varying cam surfaces for programming the movement of said jaw portions as dictated by specific workpiece removal requirements so as to vary the movement of said jaw portions relative to each other and the position of said second workpiece gripping position relative to said apparatus.

9. A workpiece transfer assembly for moving a workpiece from a first position in a first work station to a second position spaced remote therefrom, said assembly comprising:
   a workpiece transfer assembly including at least one transfer assembly arm movable between said first and second positions in response to preselected transfer requirements;
   first means for moving said at least one transfer assembly arm between said first and second positions; and,
   workpiece gripping apparatus mounted relative to said at least one transfer unit arm for gripping said workpiece for transfer between said first and second positions, said gripping apparatus comprising first and second workpiece gripping arms pivotally mounted relative to a common pivot mounting for movement between a first spaced-apart position and a second workpiece gripping position; second means for moving said gripping arms between said first spaced apart and said second workpiece gripping positions; and means for pivoting said arms about said common pivot mounting for varying position of said second workpiece gripping position relative to said apparatus.

10. The assembly as defined in claim 9 wherein said second moving means and said pivoting means comprise a cam having programmed cam surfaces thereon for contacting said workpiece gripping arms for controlling the movement of said workpiece gripping arms between said first spaced apart and said second workpiece gripping positions and for varying the position of said second workpiece gripping position relative to said apparatus, said apparatus further including means for forcing said cam into engagement with said workpiece gripping arms.

11. The assembly as defined in claim 10 wherein said cam is interchangeable with other cams having varying programmed cam surfaces.

12. The assembly as defined in claim 10 wherein said workpiece transfer assembly is spaced between said first work station and a second work station and said at least one transfer assembly arm comprises a plurality of said arms spaced equidistantly around said assembly, each said arm having at least one said workpiece gripping apparatus thereon, said assembly further including second means for selectively moving each of said arms between a retracted position spaced from one of said work stations and an extended position in communication with one of said work stations, said first moving means comprising means for rotating said plurality of arms in a generally horizontal plane about said assembly, whereby said arms are successively rotated between said first and second work stations.

13. The assembly as defined in claim 12 wherein said plurality of arms comprises four said arms.

* * * * *